US008078576B2

(12) United States Patent
Power et al.

(10) Patent No.: US 8,078,576 B2
(45) Date of Patent: Dec. 13, 2011

(54) NETWORK MANAGEMENT INFORMATION (NMI) DISTRIBUTION

(75) Inventors: John Power, Waterford (IE); Edwin Tse, Montreal (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 540 days.

(21) Appl. No.: 12/098,621

(22) Filed: Apr. 7, 2008

(65) Prior Publication Data

US 2009/0254526 A1 Oct. 8, 2009

(51) Int. Cl.
*G06F 7/00* (2006.01)
*G06F 17/00* (2006.01)

(52) U.S. Cl. ........ 707/610; 707/802; 707/822; 707/922; 707/959; 709/223

(58) Field of Classification Search .................. 709/223; 707/706, 758, 959, 610, 802, 922
See application file for complete search history.

(56) References Cited

U.S. PATENT DOCUMENTS

2010/0077069 A1* 3/2010 Kim .............................. 709/223

OTHER PUBLICATIONS

Jason Lee, Dan Guter, Martin Stoufer, and Brian Tierney; "Montoring Data Archives for Grid Environment"; 2002 IEEE; Lawrence Berkeley National Laborator.*
Christian Grunfeld; "The gLite Information System(s)"; EELA Tutorial, La PLata, Dec. 2006.*

ITU-T Recommendation M.3010 (2000) Principles for a telecommunications management network (44 pages).
3GPP Technical Specification Group Services and System Aspects; Telecommunication management; Principles and high level requirements; TS 32.101 V7.3.0, Dec. 2006 (46 pages).
3GPP Technical Specification Group Services and System Aspects; Telecommunication management; Principles and high level requirements; TS 32.101 V8.1.0, Dec. 2007 (56 pages).
Harrington et al., "An Architecture for Describing SNMP Management Frameworks", RFC 2571, Apr. 1999 (56 pages).
International Search Report and Written Opinion for PCT/SE2009/050282, mailed Jul. 8, 2009, 17 pages.
Lee, J. et al., "Monitoring Data Archives for Grid Environments", Supercomputing, ACM/IEEE 2002 Conference, Nov. 16-22, 2002, Piscataway, NJ, U.S.A., pp. 1-10, XP010893107.
Cooke, A. et al., "Relational Grid Monitoring Architecture (R-GMA)", Sep. 1, 2003, http://www.gridpp.ac.uk/papers/ah03_148.pdf, pp. 1-7, XP002529927.

(Continued)

*Primary Examiner* — Giovanna Colan
(74) *Attorney, Agent, or Firm* — Myers Bigel Sibley & Sajovec, P.A.

(57) ABSTRACT

A device associated with a network provides a query for specific network management information (NMI) to a registry, and receives, based on the query, metadata associated with the specific network management information (NMI). The device also provides a request for the specific network management information (NMI) to a plurality of producer devices identified from the metadata associated with the specific network management information (NMI), and receives one or more portions of the specific network management information (NMI) from each of the plurality of producer devices. The device further combines the one or more portions of the specific network management information (NMI) to create the specific network management information (NMI).

21 Claims, 14 Drawing Sheets

OTHER PUBLICATIONS

Zanikolas, S. et al., "A Taxonomy of Grid Monitoring Systems", Future Generations Computer Systems, Elsevier Science Publishers, Amsterdam, NL, vol. 21, No. 1, Jan. 1, 2005, pp. 163-188, XP025290516.

Cooke, A. et al., "The Relational Grid Monitoring Architecture: Mediating Information about the Grid", Journal of Grid Computing, Kluwer Academic Publishers, DO, vol. 2, No. 4, Dec. 1, 2004, pp. 323-339, XP019243507.

Grunfeld, C., UNLP, "The gLite Information System(s)", Dec. 1, 2006, http://indico.eu-eela.eu/getFile.py/access?contribId=2&resId=1&materialId=slides&confId=73>, pp. 1-18, XP002529928.

International Preliminary Report on Patentability corresponding to PCT/SE2009/050282, Date of completion: Jul. 13, 2010.

* cited by examiner

| PRODUCER NAME 400 | PRODUCER ADDRESS 410 | SCOPE / FILTER 420 | NMI TYPE 430 | VALID TIME 440 | EXPIRE TIME 450 | HASH CODE 460 | NMI IDENTIFIER 470 | ... |

| CONSUMER NAME 800 | CONSUMER ADDRESS 810 | DESIRED NMI IDENTIFIER 820 | DESIRED SEGMENT IDENTIFIERS 830 | ... |

350/380

NETWORK MANAGEMENT INFORMATION (NMI) DISTRIBUTION

TECHNICAL FIELD

Embodiments described herein relate generally to communication systems, and, more particularly, to distribution of network management information in a telecommunication system.

BACKGROUND

Current telecommunication systems use a hierarchical architecture to manage a flow of network management information (NMI) (e.g., information associated with operation, administration, maintenance, provisioning, etc. of telecommunication systems). For example, a network element (e.g., addressable and/or manageable telecommunication equipment, hardware and/or software that performs a telecommunication service function, etc.) may produce its own NMI, such as alarm information associated with the network element, performance data associated with the network element, etc. A domain manager collects the NMI from the network elements, and stores the NMI in its own data store. A large telecommunication system may have multiple domain managers, multiple network managers, and an enterprise system. Each domain manager may manage (e.g., collect NMI from) some network elements. Network managers collect the NMI stored in various domain managers, and the enterprise system collects the NMI stored in various network managers.

Such hierarchical architectures have several disadvantages. A first disadvantage is that domain managers represent a single point of failure for NMI associated with network elements. For example, if one domain manager fails, the NMI of network elements associated with the failing domain manager can not be collected by the failing domain manager and can not reach any network managers associated with the failing domain manager. In another example, if a link between a domain manager and its associated network element is not operational, the domain manager will not receive NMI from the network element. Thus, a network manager associated with the domain manager will not receive the NMI of the network element, even if there is an operational link between the network manager and the network element.

A second disadvantage of hierarchical architectures is NMI transfer latency (e.g., wasted time) caused by such architectures. NMI transfer latency is present in such architectures because the domain manager is the only entity that collects NMI from its managed network elements. For example, if a network manager or a domain manager wants to receive NMI from a network element not associated with the network manager or domain manager, the requested NMI is provided through an intermediary domain manager (e.g., the domain manager storing the requested NMI). The intermediary domain manager transfers the requested NMI in a store-and-forward manner. This type of transfer wastes time (e.g., causes latency) and is not suitable for real-time or near real-time applications.

A third disadvantage of hierarchical architectures is that they waste resources. Every time a network element changes its NMI, the network element emits a notification to its associated domain manager. The domain manager will update its NMI data store with the changed NMI, regardless if the changed NMI is required by other entities, such as a network manager, processes or operators associated with the domain manager, or other domain managers. A NMI data set associated with a network element can be large, and NMI changes can be frequent. Supporting voluminous and frequent NMI updates requires high bandwidth between a domain manager and its associated network elements, and requires substantial processing power on the part of the domain manager. Such high bandwidth and substantial processing power wastes resources if NMI and updated NMI are not required by other entities in the telecommunication network.

SUMMARY

It is an object of the invention to overcome at least some of the above disadvantages and to provide network management information (NMI) distribution that may prevent a single point of failure, NMI transfer latency, and/or a waste of resources in a network.

Embodiments described herein may provide systems and/or methods that provide distribution of network management information (NMI). For example, in one embodiment, the systems and/or methods may include a NMI producer device (e.g., a device that generates NMI, such as a network element), a NMI consumer device (e.g., a device that receives NMI, such as a domain manager), and a registrar host. The NMI producer device may store the NMI, but may not automatically send the NMI to the NMI consumer device. The NMI producer device may register metadata (or information) associated with the NMI (e.g., NMI availability information, NMI category information, NMI storage location information, etc.) with the registrar host. The registrar host may maintain metadata associated with various NMI producer devices in a registry. If the NMI consumer device seeks NMI, the NMI consumer device may query the registry for metadata associated with the desired NMI. If metadata associated with the desired NMI is found in the registry, the NMI consumer device may fetch the desired NMI from the NMI producer device (e.g., from storage associated with the NMI producer device). The NMI consumer device, after it fetches the desired NMI, may register metadata associated with its copy of the desired NMI with the registrar host. Thus, the NMI consumer device may become a NMI producer device.

In one embodiment, because metadata associated with copies of NMI may be registered in the registry, NMI consumer devices may be supported by multiple NMI producer devices. This may permit load balancing, and may prevent a single point of failure in a network. Furthermore, because metadata associated with copies of NMI may be registered in the registry, a NMI consumer device may establish parallel links or streams for fetching different segments of NMI from different locations (e.g., from different NMI producer devices). After the different segments of the NMI are retrieved, the NMI consumer device may combine the different segments of NMI to reproduce the complete NMI. Transferring different segments of NMI in parallel may take less time than transferring the complete NMI, which may help prevent NMI transfer latency. Unlike current telecommunication systems which utilize a static, hierarchical architecture and a store-and-forward paradigm, the embodiments described herein may utilize a fully-meshed transfer architecture where a NMI consumer device may directly fetch NMI (or segments of NMI) from one or more NMI producer devices.

In an exemplary embodiment, systems and/or methods described herein may provide a query for specific network management information (NMI) to a registry, and may receive, based on the query, metadata associated with the specific network management information (NMI). The systems and/or method may also provide a request for the specific network management information (NMI) to multiple producer devices identified from the metadata associated with the specific network management information (NMI), and may receive one or more portions of the specific network management information (NMI) from each of the multiple producer devices. The systems and/or methods may further combine the one or more portions of the specific network management information (NMI) to create the specific network management information (NMI).

BRIEF DESCRIPTION OF THE DRAWINGS

FIG. 4 illustrates a diagram of exemplary elements of a register NMI request capable of being generated by the producer device of the network depicted in FIG. 1;

FIG. 8 illustrates a diagram of exemplary elements of a fetch NMI request capable of being generated by the consumer device of the network depicted in FIG. 1;

DETAILED DESCRIPTION

The following detailed description refers to the accompanying drawings. The same reference numbers in different drawings may identify the same or similar elements. Also, the following detailed description does not limit the invention.

Embodiments described herein may provide systems and/or methods that provide network management information (NMI) distribution that may prevent a single point of failure, NMI transfer latency, and a waste of resources in a network.

Figure 1:
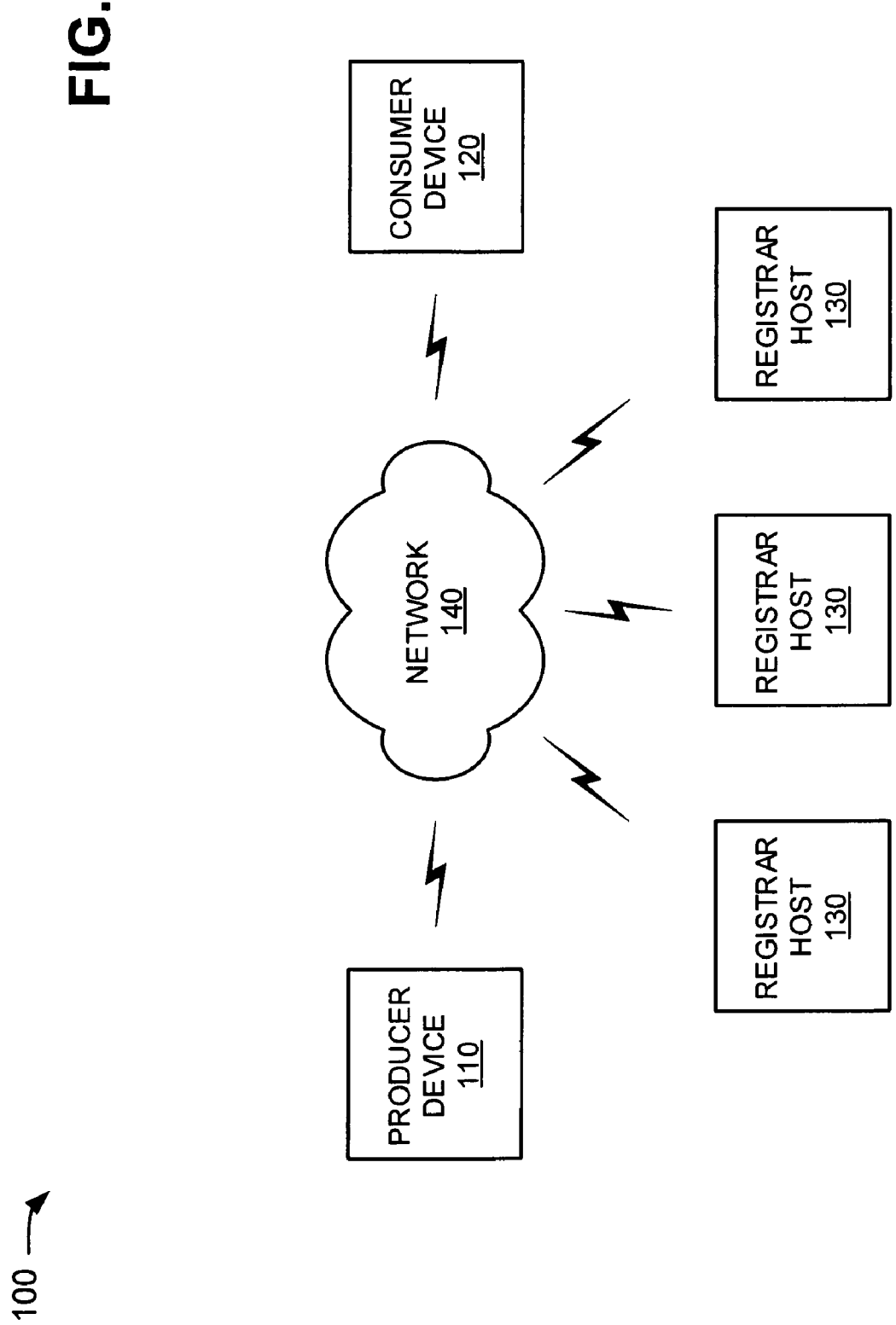
FIG. 1 depicts a diagram of an exemplary network in which systems and/or methods described herein may be implemented.

FIG. 1 depicts a diagram of an exemplary network 100 in which systems and/or methods described herein may be implemented. As illustrated, network 100 may include a producer device 110, a consumer device 120, and registrar hosts 130 interconnected by a network 140. Producer device 110, consumer device 120, and/or registrar hosts 130 may connect to network 140 via wired and/or wireless connections. A single producer device, a single consumer device, three registrar hosts, and a single network have been illustrated in FIG. 1 for simplicity. In practice, there may be more producer devices, consumer devices, registrar hosts, and/or networks. Also, in some instances, a component in network 100 (e.g., one or more of producer device 110, consumer device 120, and/or registrar hosts 130) may perform one or more functions described as being performed by another component or group of components in network 100. For example, in one embodiment, producer device 110 may act as a consumer device, and consumer device 120 may act as a producer device.

Producer device 110 may include any device capable of generating data (e.g., network management information (NMI)) associated with network 100. For example, producer device 110 may include a computer, a router, a switch, a network interface card (NIC), a hub, a bridge, a gateway, a firewall, a proxy server, an optical add-drop multiplexer (OADM), some other type of device that processes and/or transfers data, another type of computation or communication device, a thread or process running on one of these devices, and/or an object executable by one of these devices. In one embodiment, producer device 110 may include a node of a telecommunication network.

The term "data," as used herein, is to be broadly construed to include any information capable of being generated by network 100 and/or any component of network 100 (e.g., producer device 110), such as information associated with operation, administration, maintenance, provisioning, etc. of telecommunication systems, etc.

Consumer device 120 may include any device capable of receiving data (e.g., network management information (NMI)) associated with network 100. For example, consumer device 120 may include a computer, a router, a switch, a network interface card (NIC), a hub, a bridge, a gateway, a firewall, a proxy server, an optical add-drop multiplexer (OADM), some other type of device that processes and/or transfers data, another type of computation or communication device, a thread or process running on one of these devices, and/or an object executable by one of these devices. In one embodiment, consumer device 120 may include a node of a telecommunication network.

Registrar host 130 may include a device that stores and/or manages information (e.g., metadata associated with NMI). For example, registrar host 130 may include a stationary or portable computer, a personal digital assistant (PDA), a laptop, a telephone device, or another type of computation or communication device, a thread or process running on one of these devices, and/or an object executable by one of these devices. In one embodiment, each of registrar hosts 130 may store and/or maintain one or more databases (e.g., registries) of metadata (or information) associated with NMI.

The term "metadata," as used herein, is to be broadly construed to include data about data. For example, an item of metadata may describe an individual datum, a content item, and/or a collection of data including multiple content items.

Network 140 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks. In one exemplary embodiment, network 140 may include a telecommunication network.

Figure 2:
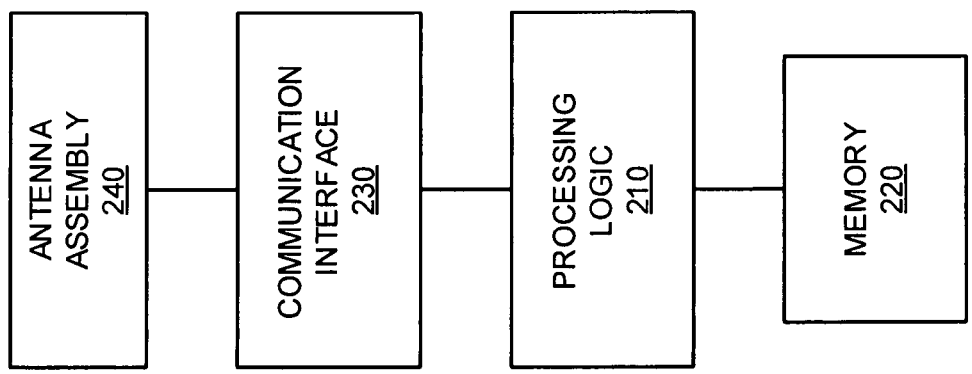
FIG. 2 illustrates exemplary components of a producer device, a consumer device, and/or a registrar host of the network depicted in FIG. 1.

FIG. 2 is an exemplary diagram of a device 200 that may correspond to producer device 110, consumer device 120, and/or one of registrar hosts 130. As illustrated, device 200 may include processing logic 210, memory 220, a communication interface 230, and/or an antenna assembly 240.

Processing logic 210 may include a processor, microprocessor, an application specific integrated circuit (ASIC), field programmable gate array (FPGA), or the like. Processing logic 210 may control operation of device 200 and its components.

Memory 220 may include a random access memory (RAM), a read only memory (ROM), and/or another type of memory to store data and instructions that may be used by processing logic 210.

Communication interface 230 may include any transceiver-like mechanism that enables device 200 to communicate with other devices and/or systems. Communication interface 230 may include, for example, a transmitter that may convert baseband signals from processing logic 210 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive RF signals over the air. Antenna assembly 240 may, for example, receive RF signals from communication interface 230 and transmit them over the air and receive RF signals over the air and provide them to communication interface 230. In one exemplary embodiment, for example, communication interface 230 may communicate via a network (e.g., network 140). Alternatively, antenna assembly 240 may be omitted and communication interface 230 may communicate with a network (e.g., network 100) via one or more physical links.

As described herein, device 200 may perform certain operations in response to processing logic 210 executing software instructions contained in a computer-readable medium, such as memory 220. A computer-readable medium may be defined as a physical or logical memory device. The software instructions may be read into memory 220 from another computer-readable medium or from another device via communication interface 230. The software instructions contained in memory 220 may cause processing logic 210 to perform processes described herein. Alternatively, hardwired circuitry may be used in place of or in combination with software instructions to implement processes described herein. Thus, embodiments described herein are not limited to any specific combination of hardware circuitry and software.

In one exemplary embodiment, device 200 may include mechanisms for inputting information to device 200 and/or for outputting information from device 200. Examples of input and output mechanisms might include buttons, a keyboard, a mouse, a pen, a microphone, voice recognition and/or biometric mechanisms, a display, a printer, a speaker, etc.

Although FIG. 2 shows exemplary components of device 200, in other embodiments, device 200 may contain fewer, different, or additional components than depicted in FIG. 2. In still other embodiments, one or more components of device 200 may perform one or more other tasks described as being performed by one or more other components of device 200.

Figure 3:
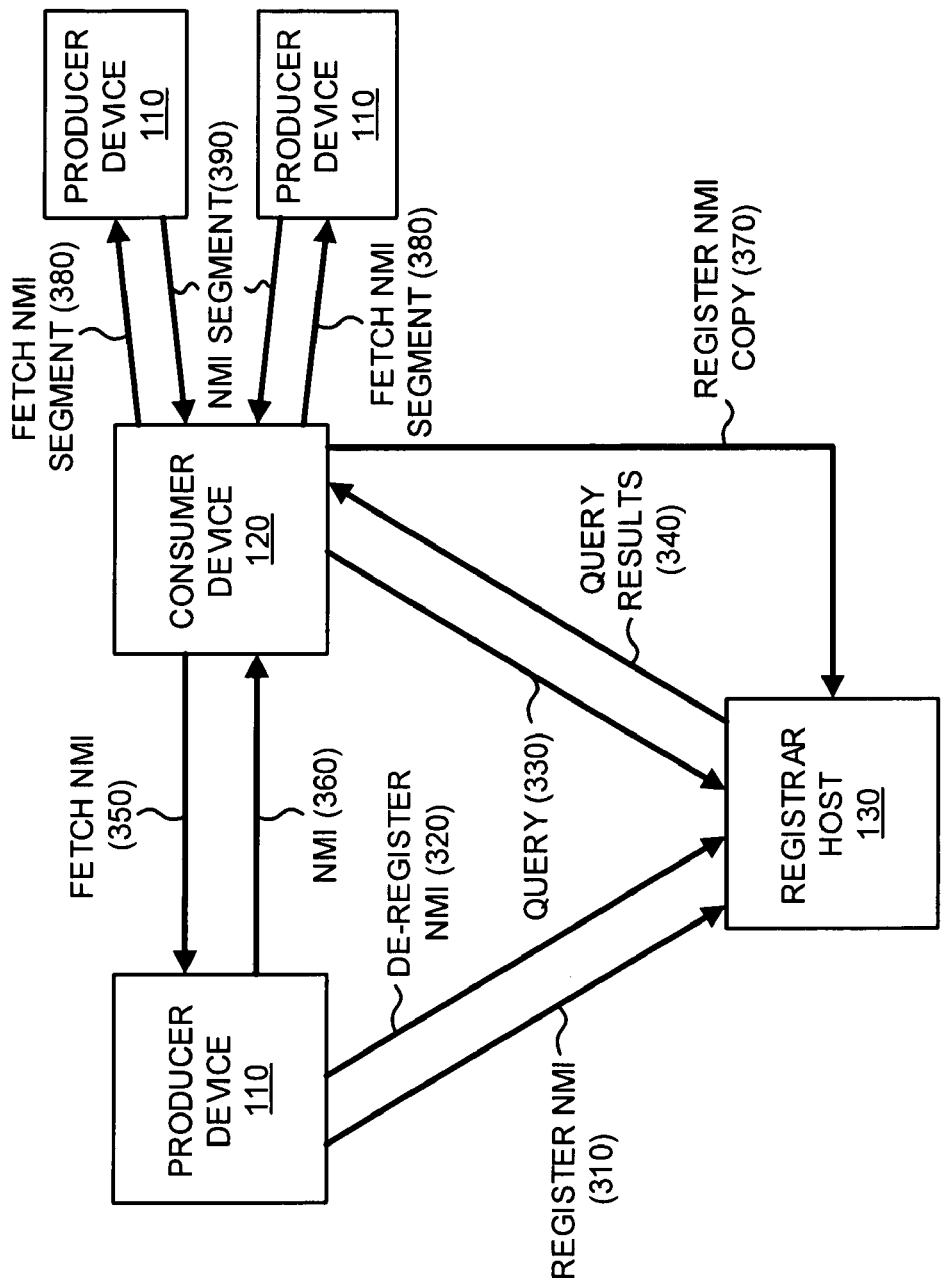
FIG. 3 depicts a diagram of an exemplary portion of the network illustrated in FIG. 1 and exemplary interactions among components of the network portion.

FIG. 3 depicts a diagram of an exemplary portion 300 of network 100 and exemplary interactions among components of network portion 300. As illustrated, network portion 300 may include producer device 110, consumer device 120, and one of registrar hosts 130. Producer device 110, consumer device 120, and registrar host 130 may include the features described above in connection with FIG. 1.

Producer device 110 may store NMI, but may not automatically send the NMI to consumer device 120. As shown in FIG. 3, producer device 110 may provide metadata (or information) associated with a particular NMI (e.g., NMI availability information, NMI category information, NMI storage location information, etc.) to registrar host 130 via a register NMI request 310. Producer device 110 may remove metadata associated with a particular NMI from registrar host 130 via a de-register NMI request 320. Registrar host 130 may maintain NMI metadata provided by various producer devices in a registry.

If consumer device 120 wishes to retrieve NMI associated with producer device 110, consumer device 120 may generate and provide a query 330 to registrar host 130. Query 330 may include information associated with a desired NMI. Registrar host 130 may receive query 330, may compare query 330 to the registry of NMI metadata, and may generate query results 340 based on the comparison. For example, registrar host 130 may provide query results 340 indicating that producer device 110 includes the desired NMI.

Consumer device 120 may receive query results 340 (e.g., indicating that producer device 110 includes the desired NMI), and may retrieve the desired NMI from producer device 110 by providing a fetch NMI request 350 to producer device 110. Fetch NMI request 350 may include information associated with the desired NMI. Producer device 110 may receive fetch NMI request 350, and may provide the desired NMI, as indicated by reference number 360, to consumer device 120. After consumer device 120 receives NMI 360, consumer device 120 may provide metadata associated with a copy of NMI 360 to registrar host 130 via a register NMI copy request 370. Thus, consumer device 120 may become a producer device. Such an arrangement may prevent a single point of failure in network 100. Although not shown in FIG. 3, consumer device 120 may remove metadata associated with the copy of NMI 360 from registrar host 130 via a de-register NMI copy request similar to de-register NMI request 320.

Because metadata associated with multiple copies of NMI may be registered in the registry provided in registrar host 130, consumer device 120 may be supported by multiple producer devices 110, as shown in FIG. 3. This may permit load balancing, and may prevent a single point of failure in network 100. Furthermore, because metadata associated with multiple copies of NMI may be registered in the registry provided in registrar host 130, consumer device 120 may establish parallel links or streams for fetching different segments of NMI from different producer devices 110. For example, as shown in FIG. 3, consumer device 120 may retrieve NMI segments from multiple producer devices 110 by providing fetch NMI segment requests 380 to producer devices 110. Fetch NMI segment requests 380 may include information associated with NMI segments. Producer devices 110 may receive fetch NMI segment requests 380, and may provide NMI segments 390 to consumer device 120 (e.g., in parallel). In an exemplary embodiment, when large NMI that is partitioned into segments is copied across a network (e.g., network 100), a consumer device (e.g., consumer device 120) desiring the NMI may use parallel data transfer from multiple producer devices (e.g., producer devices 110). Each producer device may be responsible for transferring some NMI segments to the consumer device, and other producer devices may be responsible for transferring other NMI segments to the consumer device.

After the different NMI segments 390 are retrieved, consumer device 120 may combine NMI segments 390 to reproduce the complete NMI. In one embodiment, for example, consumer device 120 may combine NMI segments 390 with the same NMI identifier and hash code (e.g., as described below in connection with FIG. 4) to ensure validity of the complete NMI. Transferring different segments of NMI in parallel may take less time than transferring the complete NMI, which may help prevent NMI transfer latency.

Unlike current telecommunication system management schemes, NMI consumer devices (e.g., consumer device 120) described herein may become NMI producer devices (e.g., producer device 110) since metadata associated with copies of NMI (e.g., stored in the NMI consumer devices) may be registered in the registry provided in registrar host 130 and may be fetched by other NMI consumer devices. Furthermore, in current telecommunication system management schemes, a number of storage locations of NMI is known and remains unchanged (e.g., is provided in a specific domain manager), unless an operator moves the NMI to another domain manager. In contrast, in embodiments described herein, a number of storage locations of NMI may change over time since multiple copies of NMI may be stored in multiple NMI producer devices (e.g., producer device 110) and/or NMI consumer devices (e.g., consumer device 120).

Although FIG. 3 shows exemplary components of network portion 300, in other embodiments, network portion 300 may contain fewer, different, or additional components than depicted in FIG. 3. In still other embodiments, one or more components of network portion 300 may perform one or more other tasks described as being performed by one or more other components of network portion 300.

FIG. 4 illustrates a diagram of exemplary elements of register NMI request 310. In one embodiment, register NMI request 310 may be generated by a producer device (e.g., producer device 110). In another embodiment, register NMI request 310 may be generated by a consumer device acting as a producer device (e.g., consumer device 120), and may include information similar to information included in register NMI copy request 370. As illustrated, register NMI request 310 may include a producer name field 400, a producer address field 410, a scope/filter field 420, a NMI type field 430, a valid time field 440, an expire time field 450, a hash code field 460, and/or a NMI identifier field 470.

Producer name field 400 may include information that identifies a producer device (e.g., producer device 110) of a subject NMI. For example, in one embodiment, producer name field 400 may include a name associated with producer device 110.

Producer address field 410 may include information that identifies a location (e.g., an address of a producer device, such as producer device 110) of the subject NMI. For example, in one embodiment, producer address field 410 may include an address associated with producer device 110.

Scope/filter field 420 may include information that identifies a set of managed objects associated with a producer device (e.g., producer device 110). The information of the identified set of managed objects may collectively be referred to as network management information (NMI) of a producer device. For example, in one embodiment, scope/filter field 420 may include information associated with NMI 360 of producer device 110.

NMI type field 430 may include information that identifies a type associated with the subject NMI. For example, in one embodiment, NMI type field 430 may include information that identifies if the subject NMI relates to network configuration data, fault management data, etc.

Valid time field 440 may include information that identifies a date and/or time from when the subject NMI is valid. For example, in one embodiment, valid time field 440 may indicate that NMI 360 is valid from Mar. 1, 2008 at 10:00 AM.

Expire time field 450 may include information that identifies a date and/or time beyond which the subject NMI is considered invalid. For example, in one embodiment, expire time field 450 may indicate that NMI 360 is invalid after Mar. 2, 2008 at 10:00 AM.

Hash code field 460 may include information (e.g., a hash code) that may be used to compare different copies of NMI. For example, in one embodiment, in the event that several copies of NMI exist for the same NMI identifier field 470 (e.g., a field that identifies a unique identifier for the subject NMI), with different hash codes, the copy of NMI with the most recent valid time field 440 may be considered valid. The registries stored and/or maintained by registrar hosts 130 may update information contained in the registries based on hash code field 460.

NMI identifier field 470 may include information that identifies a unique identifier of the subject NMI. For example, in one embodiment, NMI identifier field 470 may include a unique identifier (e.g., a number, a letter, a combination of numbers and/or letters, one or more characters, etc.) that identifies NMI (e.g., NMI 360).

In one exemplary embodiment, register NMI request 310 may include the following format: register(producerName, producerAddress, scopeAndFilter, NMIType, validTime, expireTime, hashCode): nMI-ID, where producerName may correspond to producer name field 400, producerAddress may correspond to producer address field 410, scopeAndFilter may correspond to scope/filter field 420, NMIType may correspond to NMI type field 430, validTime may correspond to valid time field 440, expireTime may correspond to expire time field 450, hashCode may correspond to hash code field 460, and nMI-ID may correspond to NMI identifier field 470. Producer device 110 may provide register NMI request 310 to registrar host 130, and registrar host 130 may record information provided by register NMI request 310 in the registry associated with registrar host 130. In one embodiment, for example, registrar host 130 may record information provided by register NMI request 310 as a record in the registry.

Although FIG. 4 shows exemplary elements of register NMI request 310, in other embodiments, register NMI request 310 may contain fewer, different, or additional elements than depicted in FIG. 4. For example, if a segment of NMI is registered by register NMI request 310, register NMI request 310 may include a list of segment identifiers field that may include information associated with NMI segment identifiers. The NMI segments, each identified by a NMI segment identifier, may together include a subject NMI. In still other embodiments, one or more elements of register NMI request 310 may perform one or more other tasks described as being performed by one or more other elements of register NMI request 310.

Figure 5:
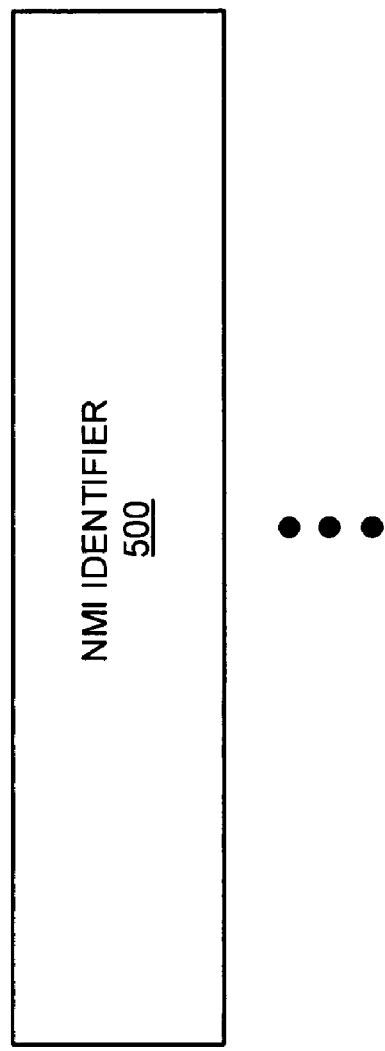
FIG. 5 depicts a diagram of an exemplary element of a de-register NMI request capable of being generated by the producer device of the network illustrated in FIG. 1.

FIG. 5 depicts a diagram of an exemplary element of de-register NMI request 320. In one embodiment, de-register NMI request 320 may be generated by a producer device (e.g., producer device 110). In another embodiment, de-register NMI request 320 may be generated by a consumer device acting as a producer device (e.g., consumer device 120). As illustrated, de-register NMI request 320 may include a NMI identifier field 500.

NMI identifier field 500 may include information that identifies a unique identifier of a subject NMI. For example, in one embodiment, NMI identifier field 500 may include a unique identifier (e.g., a number, a letter, a combination of numbers and/or letters, one or more characters, etc.) that identifies NMI (e.g., NMI 360).

In one exemplary embodiment, de-register NMI request 320 may include the following format: deregister(nMI-ID), where nMI-ID may correspond to NMI identifier field 500. Producer device 110 may provide de-register NMI request 320 to registrar host 130. Registrar host 130 may remove information associated with the NMI identified by de-register NMI request 320 from the registry provided in registrar host 130.

Although FIG. 5 shows an exemplary element of de-register NMI request 320, in other embodiments, de-register NMI request 320 may contain different or additional elements than depicted in FIG. 5.

Figure 6:
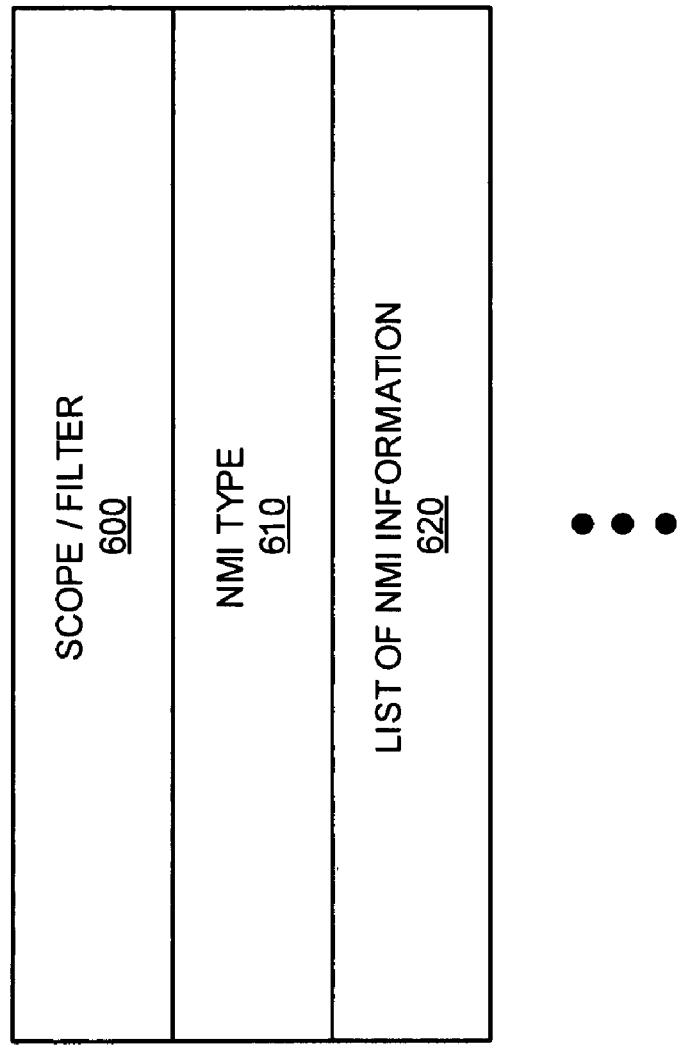
FIG. 6 illustrates a diagram of exemplary elements of a query capable of being generated by the consumer device of the network depicted in FIG. 1.

FIG. 6 illustrates a diagram of exemplary elements of query 330. In one embodiment, query 330 may be generated by a consumer device (e.g., consumer device 120). In another embodiment, query 330 may be generated by a device other than or in addition to consumer device 120. As illustrated, query 330 may include a scope/filter field 600, a NMI type field 610, and/or a list of NMI information field 620.

Scope/filter field 600 may include information that identifies a set of managed objects associated with a producer device (e.g., producer device 110). The information of the identified set of managed objects may collectively be referred to as network management information (NMI) of a producer device. For example, in one embodiment, scope/filter field 600 may include information associated with NMI 360 of producer device 110.

NMI type field 610 may include information that identifies a type associated with the subject NMI. For example, in one embodiment, NMI type field 610 may include information that identifies if the subject NMI relates to network configuration data, fault management data, etc.

List of NMI information field 620 may include a list of information associated with the subject NMI. For example, in one embodiment, list of NMI information field 620 may include a list of information (e.g., valid time information, expire time information, hash code information, etc.) associated with NMI 360 of producer device 110.

In one exemplary embodiment, query 330 may include the following format: query(scopeAndFilter, NMIType): ListOfNMI-Info, where scopeAndFilter may correspond to scope/filter field 600, NMIType may correspond to NMI type field 610, and ListOfNMI-Info may correspond to list of NMI information field 620. Consumer device 120 may provide query 330 to registrar host 130. Registrar host 130 may receive query 330, and may compare the fields (e.g., fields 600-620) of query 330 to the registry of NMI metadata stored and/or maintained by registrar host 130. Registrar host 130 may generate query results 340 based on the comparison (e.g., based on matches or non-matches of fields 600-620 with the NMI metadata). For example, registrar host 130 may provide query results 340 indicating that producer device 110 includes the desired NMI (e.g., NMI 360).

Although FIG. 6 shows exemplary elements of query 330, in other embodiments, query 330 may contain fewer, different, or additional elements than depicted in FIG. 6. In still other embodiments, one or more elements of query 330 may perform one or more other tasks described as being performed by one or more other elements of query 330.

Figure 7:
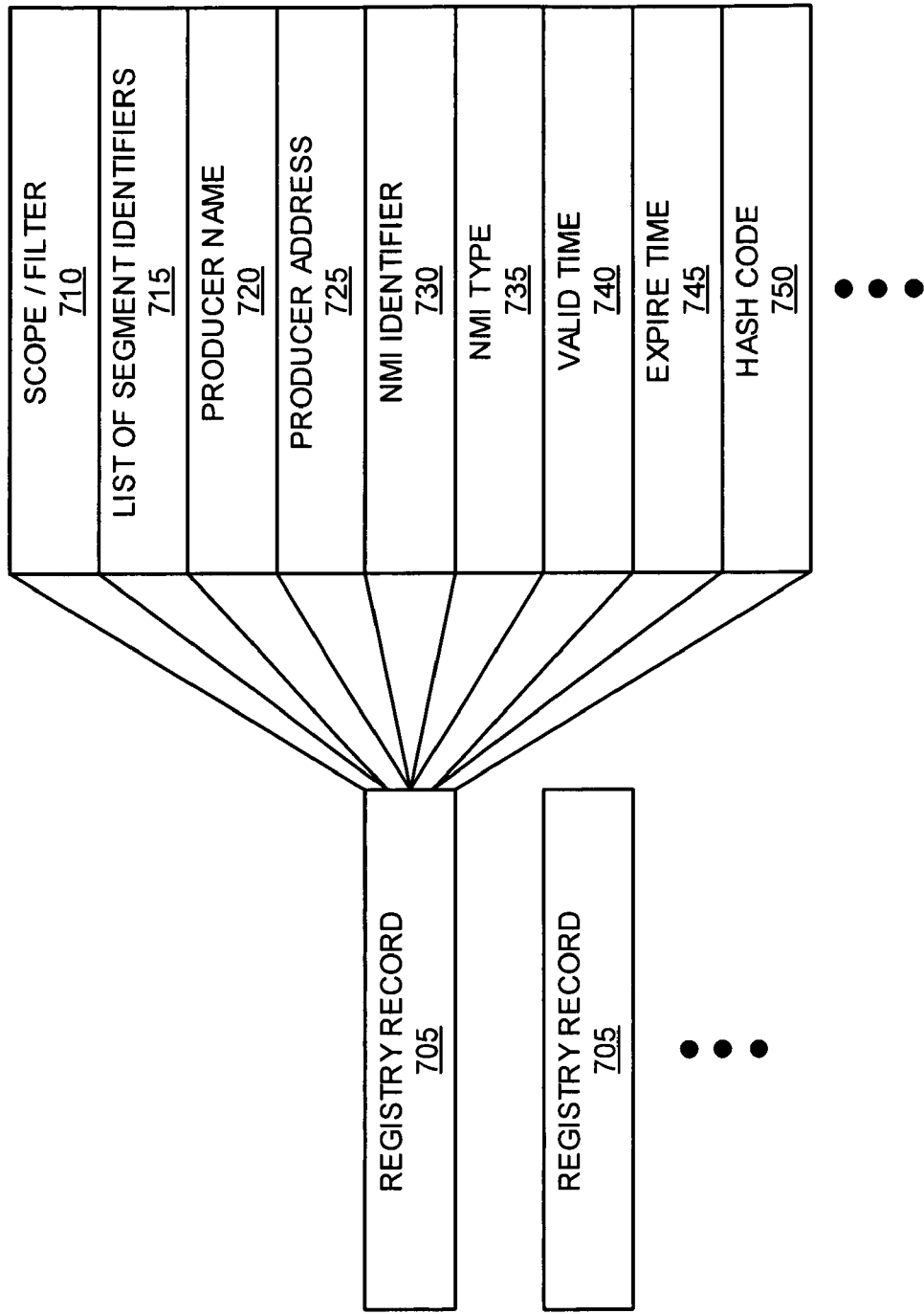
FIG. 7 depicts a diagram of an exemplary portion of a registry capable of being stored and/or maintained by the registrar host of the network illustrated in FIG. 1.

FIG. 7 depicts a diagram of an exemplary portion 700 of a registry. In one embodiment, registry portion 700 may be stored and/or maintained by one or more of registrar hosts 130 (e.g., within memory 220). In another embodiment, registry portion 700 may be stored and/or maintained by a device other than or in addition to one or more of registrar hosts 130. As illustrated in FIG. 7, registry portion 700 may include one or more registry records 705. Each registry record 705 may include a scope/filter field 710, a list of segment identifiers field 715, a producer name field 720, a producer address field 725, a NMI identifier field 730, a NMI type field 735, a valid time field 740, an expire time field 745, and/or a hash code field 750.

Scope/filter field 710 may include information that identifies a set of managed objects associated with a producer device (e.g., producer device 110). The information of the identified set of managed objects may collectively be referred to as network management information (NMI) of a producer device. For example, in one embodiment, scope/filter field 710 may include information associated with NMI 360 of producer device 110.

List of segment identifiers field 715 may include information that identifies NMI segment identifiers. The NMI segments, each identified by a NMI segment identifier, may together include a subject NMI. For example, in one embodiment, list of segment identifiers field 715 may include identifiers for segments of NMI 360 (e.g., a first portion of NMI 360 may include an identifier associated with a first producer device, a second portion of NMI 360 may include an identifier associated with a second producer device, etc.).

Producer name field 720 may include information that identifies a producer device (e.g., producer device 110) of the subject NMI. For example, in one embodiment, producer name field 720 may include a name associated with producer device 110.

Producer address field 725 may include information that identifies a location (e.g., an address of a producer device, such as producer device 110) of the subject NMI. For example, in one embodiment, producer address field 725 may include an address associated with producer device 110.

NMI identifier field 730 may include information that identifies a unique identifier of the subject NMI. For example, in one embodiment, NMI identifier field 730 may include a unique identifier (e.g., a number, a letter, a combination of numbers and/or letters, one or more characters, etc.) that identifies NMI (e.g., NMI 360).

NMI type field 735 may include information that identifies a type associated with the subject NMI. For example, in one embodiment, NMI type field 735 may include information that identifies if the subject NMI relates to network configuration data, fault management data, etc.

Valid time field 740 may include information that identifies a date and/or time from when the subject NMI is valid. For example, in one embodiment, valid time field 740 may indicate that NMI (e.g., NMI 360) is valid from Mar. 1, 2008 at 10:00 AM.

Expire time field 745 may include information that identifies a date and/or time beyond which the subject NMI is considered invalid. For example, in one embodiment, expire time field 745 may indicate that NMI (e.g., NMI 360) is invalid after Mar. 2, 2008 at 10:00 AM.

Hash code field 750 may include information (e.g., a hash code) that may be used to compare different copies of NMI. For example, in one embodiment, in the event that several copies of NMI exist for the same NMI identifier field 730, with different hash codes, the copy of NMI with the most recent valid time field 440 may be considered valid. Registrar host 130 may update information contained in registry portion 700 based on hash code field 750.

In one exemplary embodiment, the information contained in one or more of the exemplary fields 710-750 may be provided to registrar host 130 by producer device 110 (e.g., via register NMI request 310). In another exemplary embodiment, the information contained in one or more of the exemplary fields 710-750 may be provided to registrar host 130 by consumer device 120 (e.g., via register NMI copy request 370).

Although FIG. 7 shows exemplary elements of registry portion 700, in other embodiments, registry portion 700 may contain fewer, different, or additional elements than depicted in FIG. 7. In still other embodiments, one or more elements of registry portion 700 may perform one or more other tasks described as being performed by one or more other elements of registry portion 700.

FIG. 8 illustrates a diagram of exemplary elements of fetch NMI request 350 and/or 380. In one embodiment, fetch NMI request 350/380 may be generated by a consumer device (e.g., consumer device 120). In another embodiment, fetch NMI request 350/380 may be generated by a device other than or in addition to consumer device 120. As illustrated, fetch NMI request 350/380 may include a consumer name field 800, a consumer address field 810, a desired NMI identifier field 820, and/or a desired segment identifiers field 830.

Consumer name field 800 may include information that identifies a consumer device (e.g., consumer device 120) that wishes to receive a subject NMI. For example, in one embodiment, consumer name field 800 may include a name associated with consumer device 120.

Consumer address field 810 may include information that identifies a location (e.g., an address of a consumer device, such as consumer device 120) of a consumer device that wishes to receive the subject NMI. For example, in one embodiment, consumer address field 810 may include an address associated with consumer device 120.

Desired NMI identifier field 820 may include information that identifies a unique identifier of the subject NMI that a consumer device (e.g., consumer device 120) wishes to receive. For example, in one embodiment, desired NMI identifier field 820 may include a unique identifier (e.g., a number, a letter, a combination of numbers and/or letters, one or more characters, etc.) that identifies NMI (e.g., NMI 360).

Desired segment identifiers field 830 may include information that identifies one or more segment identifiers associated with segments of the subject NMI that a consumer device (e.g., consumer device 120) wishes to receive. For example, in one embodiment, desired segment identifiers field 830 may include identifiers for segments of NMI (e.g., a first portion of NMI may include an identifier associated with a first producer device, a second portion of NMI may include an identifier associated with second producer device, etc.).

In one exemplary embodiment, fetch NMI request 350/380 may include the following format: fetch(consumerName, consumerAddress, wantedNMI-ID, wantedSegmentIDs), where consumerName may correspond to consumer name field 800, consumerAddress may correspond to consumer address field 810, wantedNMI-ID may correspond to desired NMI identifier field 820, and wantedSegmentIDs may correspond to desired segment identifiers field 830. Consumer device 120 may provide fetch NMI request 350/380 to producer device 110. Producer device 110 may retrieve the NMI (or NMI segment) requested by fetch NMI request 350/380 (e.g., from memory 220 associated producer device 110), and may provide the requested NMI (e.g., NMI 360 or NMI segments 390) to consumer device 120. Consumer device 120, after it fetches the requested NMI, may register metadata associated with its copy of the requested NMI with registrar host 130. Thus, consumer device 120 may become a producer device.

Although FIG. 8 shows exemplary elements of fetch NMI request 350/380, in other embodiments, fetch NMI request 350/380 may contain fewer, different, or additional elements than depicted in FIG. 8. In still other embodiments, one or more elements of fetch NMI request 350/380 may perform one or more other tasks described as being performed by one or more other elements of fetch NMI request 350/380.

FIGS. 9-12 depict flow charts of an exemplary process 900 for providing a registry of metadata associated with NMI according to embodiments described herein. In one embodiment, process 900 may be performed by hardware and/or software components of registrar host 130. In other embodiments, process 900 may be performed by hardware and/or software components of registrar host 130 in combination with hardware and/or software components of another device (e.g., communicating with registrar host 130).

Figure 9:
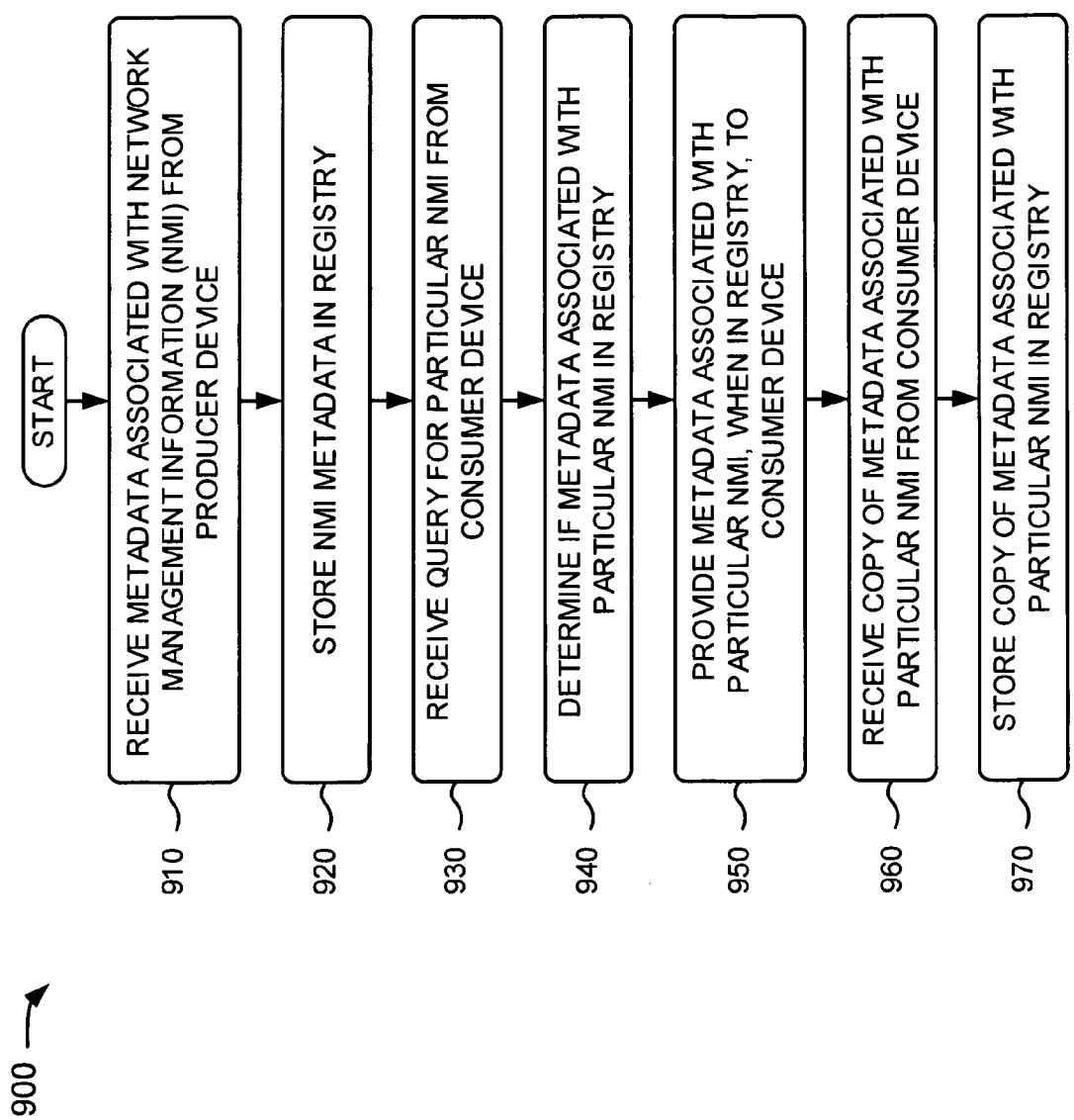
FIGS. 9-12 depict flow charts of an exemplary process for providing a registry of metadata associated with NMI according to embodiments described herein.

As illustrated in FIG. 9, process 900 may begin with receipt of metadata (or information) associated with network management information (NMI) from a producer device (block 910), and storage of the NMI metadata in a registry (block 920). For example, in embodiments described above in connection with FIG. 3, producer device 110 may provide metadata (or information) associated with a particular NMI (e.g., NMI availability information, NMI category information, NMI storage location information, etc.) to registrar host 130 via register NMI request 310. Registrar host 130 may maintain NMI metadata provided by various producer devices in a registry.

Returning to FIG. 9, a query for a particular NMI may be received from a consumer device (block 930), it may be determined if metadata associated with the particular NMI is provided in the registry (block 940), and the metadata associated with the particular NMI, when provided in the registry, may be provided to the consumer device (block 950). For example, in embodiments described above in connection with FIG. 3, if consumer device 120 wishes to retrieve NMI associated with producer device 110, consumer device 120 may generate and provide a query 330 to registrar host 130. Query 330 may include information associated with a desired NMI. Registrar host 130 may receive query 330, may compare one or more pieces of information from query 330 to information in the registry of NMI metadata, and may generate query results 340 based on the comparison. In one example, registrar host 130 may provide query results 340 indicating that producer device 110 includes the desired NMI.

As further shown in FIG. 9, a copy of metadata (or information) associated with the particular NMI may be received from the consumer device (block 960), and the copy of the metadata associated with the particular NMI may be stored in the registry (block 970). For example, in embodiments described above in connection with FIG. 3, consumer device 120 may receive query results 340 (e.g., indicating that producer device 110 includes the desired NMI), and may retrieve the desired NMI from producer device 110 by providing fetch NMI request 350 to producer device 110. Producer device 110 may receive fetch NMI request 350, and may provide the desired NMI, as indicated by reference number 360, to consumer device 120. After consumer device 120 receives NMI 360, consumer device 120 may provide metadata (or information) associated with a copy of NMI 360 to registrar host 130 via register NMI copy request 370.

Figure 10:
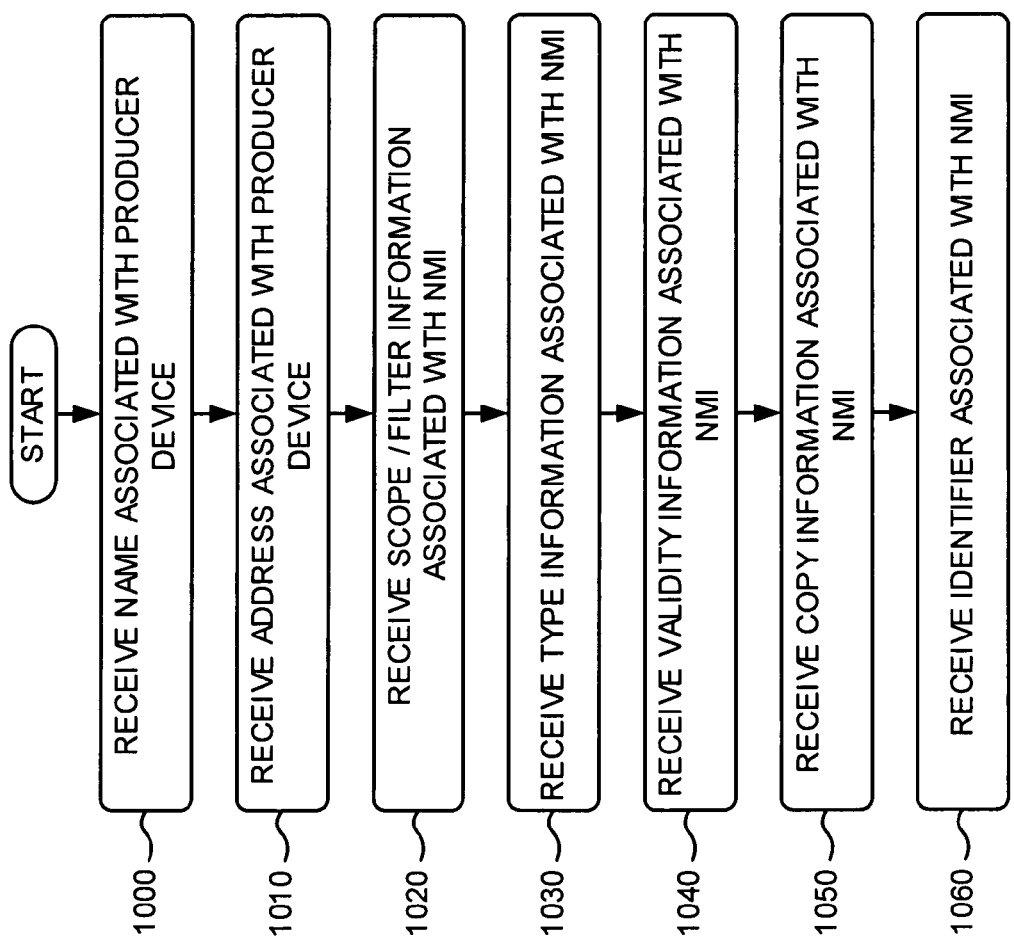

Process block 910 may include the process blocks depicted in FIG. 10. As illustrated in FIG. 10, process block 910 may include receiving one or more of a name associated with the producer device (block 1000), an address associated with the producer device (block 1010), scope and/or filter information associated with the NMI (block 1020), type information associated with the NMI (block 1030), validity information associated with the NMI (block 1040), copy information (e.g., a hash code) associated with the NMI (block 1050), and/or an identifier associated with the NMI (block 1060). For example, in embodiments described above in connection with FIG. 4, producer device 110 may provide register NMI request 310 to registrar host 130, and registrar host 130 may record information provided by register NMI request 310 in the registry associated with registrar host 130. Register NMI request 310 may include producer name field 400 (e.g., that identifies a producer device of a subject NMI), producer address field 410 (e.g., that provides an address of a producer device), scope/filter field 420 (e.g., that identifies NMI), NMI type field 430 (e.g., that identifies a type associated with the subject NMI), valid time field 440 (e.g., that identifies a date and/or time from when the subject NMI is valid), expire time field 450 (e.g., that identifies a date and/or time beyond which the subject NMI is considered invalid), hash code field 460 (e.g., that may be used to compare different copies of NMI), and/or NMI identifier field 470 (e.g., that identifies a unique identifier of the subject NMI).

Figure 11:
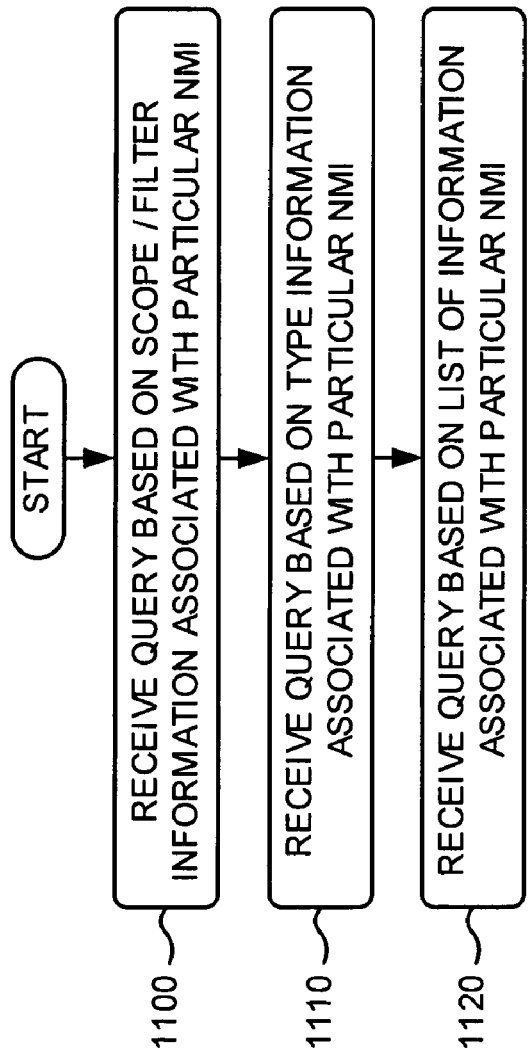

Process block 930 may include the process blocks depicted in FIG. 11. As illustrated in FIG. 11, process block 930 may include one or more of receiving a query based on scope and/or filter information associated with the particular NMI (block 1100), receiving a query based on type information associated with the particular NMI (block 1110), and/or receiving a query based on a list of information associated with the particular NMI (block 1120). For example, in embodiments described above in connection with FIG. 6, registrar host 130 may receive query 330, and may compare the fields (e.g., fields 600-620) of query 330 to the registry of NMI metadata stored and/or maintained by registrar host 130. Query 330 may include scope/filter field 600 (e.g., that identifies NMI of a producer device), NMI type field 610 (e.g., that identifies a type associated with the subject NMI), and/or list of NMI information field 620 (e.g., that includes a list of information associated with the subject NMI).

Figure 12:

Process block 960 may include the process blocks depicted in FIG. 12. As illustrated in FIG. 12, process block 960 may include receiving one or more of a name associated with the consumer device (block 1200), an address associated with the consumer device (block 1210), a copy of scope and/or filter information associated with the particular NMI (block 1220), a copy of type information associated with the particular NMI (block 1230), a copy of validity information associated with the particular NMI (block 1240), a copy of copy information (e.g., a hash code) associated with the particular NMI (block 1250), and/or a copy of the identifier associated with the particular NMI (block 1260). For example, in embodiments described above in connection with FIGS. 3 and 4, after consumer device 120 receives NMI 360, consumer device 120 may provide metadata associated with a copy of NMI 360 to registrar host 130 via register NMI copy request 370. Register NMI request 310 may include information similar to information included in register NMI copy request 370. Thus, register NMI request 370 may include a consumer name field (e.g., that identifies a consumer device registering the subject NMI), a consumer address field (e.g., that provides an address of the consumer device), a scope/filter field (e.g., that identifies a copy of the NMI), a NMI type field (e.g., that identifies a copy of a type associated with the NMI), a valid time field (e.g., that identifies a copy of a date and/or time from when the NMI is valid), an expire time field (e.g., that identifies a copy of a date and/or time beyond which the NMI is considered invalid), a hash code field (e.g., that may be used to compare different copies of the NMI), and/or a NMI identifier field (e.g., that identifies a copy of a unique identifier of the NMI).

Figure 13:
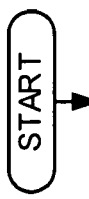
FIGS. 13 and 14 illustrate flow charts of an exemplary process for searching metadata associated with NMI, retrieving the NMI, and registering a copy of the NMI according to embodiments described herein.
Figure 14:
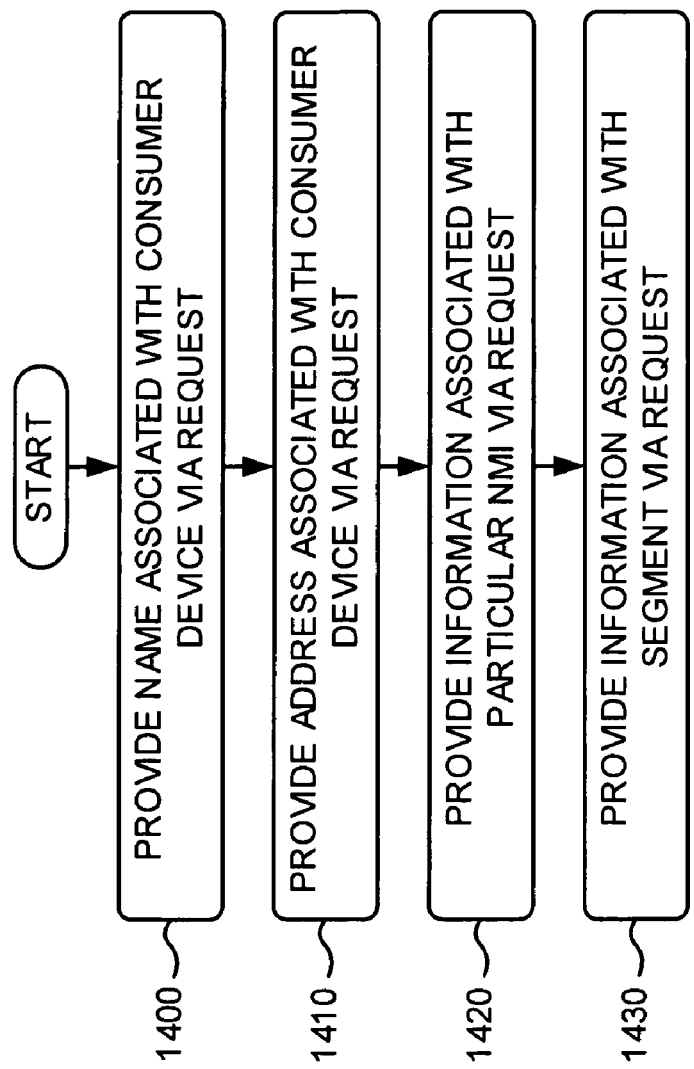

FIGS. 13 and 14 depict flow charts of an exemplary process 1300 for searching metadata (or information) associated with NMI, retrieving the NMI, and registering a copy of the NMI according to embodiments described herein. In one embodiment, process 1300 may be performed by hardware and/or software components of consumer device 120. In other embodiments, process 1300 may be performed by hardware and/or software components of consumer device 120 in combination with hardware and/or software components of another device (e.g., communicating with consumer device 120).

As illustrated in FIG. 13, process 1300 may begin with providing a query for particular network management information (NMI) to a registry (block 1310), and receiving metadata (or information) associated with the particular NMI from the registry, based on the query (block 1320). For example, in embodiments described above in connection with FIG. 3, if consumer device 120 wishes to retrieve NMI associated with producer device 110, consumer device 120 may generate and provide query 330 to registrar host 130. Query 330 may include information associated with a desired NMI. Registrar host 130 may receive query 330, may compare query 330 to the registry of NMI metadata, and may generate query results 340 based on the comparison. In one example, registrar host 130 may provide query results 340 indicating that producer device 110 includes the desired NMI.

As further shown in FIG. 13, a request for the particular NMI may be provided to one or more producer devices identified from the metadata (block 1330), and one or more portions of the particular NMI may be received from the one or more producer devices (block 1340). For example, in embodiments described above in connection with FIG. 3, consumer device 120 may receive query results 340 (e.g., indicating that producer device 110 includes the desired NMI), and may retrieve the desired NMI from producer device 110 by providing fetch NMI request 350 to producer device 110. Producer device 110 may receive fetch NMI request 350, and may provide the desired NMI, as indicated by reference number 360, to consumer device 120. In one example, consumer device 120 may be supported by multiple producer devices 110, and may establish parallel links or streams for fetching different segments of NMI from different producer devices 110. Consumer device 120 may retrieve NMI segments from multiple producer devices 110 by providing fetch NMI segment requests 380 to producer devices 110. Producer devices 110 may receive fetch NMI segment requests 380, and may provide NMI segments 390 to consumer device 120 (e.g., in parallel).

Returning to FIG. 13, the one or more portions of the particular NMI may be combined to create the particular NMI (block 1340), and a copy of metadata associated with the particular NMI may be provided to the registry (block 1350). For example, in embodiments described above in connection with FIG. 3, after the different NMI segments 390 are retrieved, consumer device 120 may combine NMI segments 390 to reproduce the complete NMI. In one example, consumer device 120 may combine NMI segments 390 with the same NMI identifier and hash code to ensure validity of the complete NMI. After consumer device 120 receives NMI 360, consumer device 120 may provide metadata associated with a copy of NMI 360 to registrar host 130 via a register NMI copy request 370.

Process block 1330 may include the process blocks depicted in FIG. 14. As illustrated in FIG. 14, process block 1330 may include one or more of providing a name associated with the consumer device via the request (block 1400), providing an address associated with the consumer device via the request (block 1410), providing information associated with the particular NMI via the request (block 1420), and/or providing information associated with a segment via the request (block 1430). For example, in embodiments described above in connection with FIG. 8, consumer device 120 may provide fetch NMI request 350/380 to producer device 110. Fetch NMI request 350/380 may include consumer name field 800 (e.g., identifying a consumer device that wishes to receive a subject NMI), consumer address field 810 (e.g., that identifies an address of the consumer device that wishes to receive the subject NMI), desired NMI identifier field 820 (e.g., that provides a unique identifier of the subject NMI), and/or desired segment identifiers field 830 (e.g., that identifies one or more segment identifiers associated with segments of the subject NMI).

Embodiments described herein may provide systems and/or methods that provide network management information (NMI) distribution that may prevent a single point of failure, NMI transfer latency, and/or a waste of resources in a network.

Embodiments described herein may provide a variety of advantages. For example, embodiments described herein do not require replacement of the current store-and-forward paradigm or the architecture to distribute NMI. Rather, embodiments described herein may utilize the store-and-forward paradigm for transferring NMI availability information, rather than NMI. Embodiments described herein transfer the NMI from NMI producer devices (e.g., NMI originators or NMI copy owners) to NMI consumer devices without involvement of domain managers as intermediaries. The direct transfer of NMI may be quicker than current NMI distribution methods. Furthermore, by partitioning the registry or by selectively exposing specific portions of the registry, embodiments described herein may enable exchange of data between domain managers within different regions of the same network or between network managers of different networks.

In current systems, the domain manager relies upon a notification system to keep its NMI in synch with NMI of network elements. If there is a disruption of communication between the domain manager and the network elements, the domain manager needs to poll the network elements for possible NMI changes since notifications about possible NMI changes may be lost between the domain manager and the network elements. Embodiments described herein may eliminate the need for such polling. When communication is re-established after a disruption, embodiments described herein may enable a network element to determine if its NMI has changed since a prior registration. If the NMI has changed since a prior registration, embodiments described herein may enable the network element to update its registration with the registry (e.g., provided in registrar host 130). If the NMI has not changed since a prior registration, embodiments described herein may enable the network element to do nothing.

Embodiments described herein may eliminate unnecessary synchronization of infrequently changing information. In current systems, a network manager may perform a full synchronization with all of its corresponding domain managers once every twenty-four hours. Embodiments described herein may apply time-based policies to different portions of the registry (e.g., provided in registrar host 130) so that frequently changing NMI may be checked by consumer devices more regularly than infrequently changing NMI. This may be achieved by valid time field 440 and/or expire time field 450, as described above in connection with FIG. 4.

Embodiments described herein may further eliminate a need to develop costly applications, at the domain manager and/or network manager levels, to check consistency of large volumes of data and to generate repair data. Embodiments described herein also may enable fast propagation of data throughout a network (e.g., network 100), and may prevent a single source of congestion in a network (e.g., as is the case with domain managers in current systems). In a large network, such as a global telecommunication network, the domain managers may be geographically distant from network elements (e.g., residing in a city). Embodiments described herein may reduce and/or eliminate the latency introduced by current systems (e.g., by NMI transported via the domain manager in current systems), by enabling the NMI to be directly transmitted between the network elements.

The foregoing description of embodiments provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 9-14, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary embodiments, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. The logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network method comprising:
   receiving, at a registrar host, a query for particular network management information (NMI) from a consumer device;
   determining, at the registrar host, if first metadata associated with the particular network management information (NMI) is included in a first registry record in registry memory;
   providing, when included in the registry memory, the first metadata associated with the particular network management information (NMI) and including a particular NMI identifier for the particular network management information (NMI) and an address associated with a producer device from the registrar host to the consumer device, wherein the first metadata identifies the producer device as a source of the particular network management information (NMI) that is identified by the NMI identifier;

receiving second metadata associated with the particular network management information (NMI) from the consumer device wherein the second metadata includes the particular NMI identifier for the particular network management information (NMI) and an address associated with the consumer device, wherein the second metadata identifies the consumer device as a source that duplicates the particular network management information (NMI) that is identified by the NMI identifier; and storing the second metadata associated with the particular network management information (NMI) and including the particular NMI identifier for the particular network management information (NMI) and the address associated with the consumer device in a second registry record in the registry memory, wherein after storing the second metadata, the registry memory includes the first and second registry records, wherein the first registry record includes the particular NMI identifier for the particular network management information (NMI) and the address associated with the producer device, and wherein the second registry record includes the particular NMI identifier for the particular network management information (NMI) and the address associated with the consumer device, so that the first and second registry records in the registry memory at the registry host identify the producer device and the consumer device as different sources duplicating the same particular network management information identified by the NMI identifier.

2. The method of claim 1, further comprising:

before receiving the query, receiving, at the registrar host, the first metadata associated with the particular network management information (NMI) and including the particular NMI identifier for the particular network management information (NMI) and the address associated with the first producer device the producer device; and before receiving the query, storing the first metadata associated with the particular network management information (NMI) including the particular NMI identifier for the particular network management information (NMI) and the address associated with the producer device in the first registry record in the registry memory.

3. The method of claim 2, where receiving the first metadata associated with the particular network management information (NMI) from the producer device comprises at least one of:

receiving a name associated with the producer device;

receiving scope and filter information associated with the particular network management information (NMI);

receiving type information associated with the particular network management information (NMI);

receiving validity information associated with the particular network management information (NMI); or receiving a hash code associated with the particular network management information (NMI).

4. The method of claim 1, where receiving a query for the particular network management information (NMI) comprises at least one of:

receiving a query at the registrar host from the consumer device based on scope and filter information associated with the particular network management information (NMI);

receiving a query at the registrar host from the consumer device based on type information associated with the particular network management information (NMI); or receiving a query at the registrar host form the consumer device based on a list of information associated with the particular network management information (NMI).

5. The method of claim 1, wherein the first metadata and the second metadata each comprise respective copies of a same hash code associated with the particular network management information (NMI).

6. A network method comprising:

providing a query for particular network management information (NMI) from a consumer device to a registrar host;

receiving at the consumer device from the registry host, based on the query, first metadata associated with the particular network management information (NMI) wherein the first metadata includes a particular NMI identifier for the particular network management information and one or more addresses associated with one or more producer devices wherein each of the one or more producer devices is a source of the particular network management information (NMI) that is identified by the NMI identifier;

providing a request for the particular network management information (NMI) from the consumer device to the one or more producer devices identified from the one or more addresses included in the first metadata associated with the particular network management information (NMI) wherein the request includes the particular NMI identifier received in the first metadata;

receiving one or more portions of the particular network management information (NMI) at the consumer device from the one or more producer devices identified from the one or more addresses included in the first metadata;

duplicating the particular network management information (NMI) at the consumer device using the one or more portions of the particular network management information (NMI) received from the one or more producer devices, so that the consumer device and each of the one or more producer devices duplicate the same particular network management information; and providing second metadata associated with the particular network management information (NMI) from the consumer device to the registry host, wherein the second metadata includes the particular NMI identifier for the particular network management information (NMI) and an address associated with the consumer device, so that the first and second metadata identify the consumer device and each of the one or more producer devices as different sources duplicating the same particular network management information identified by the NMI identifier.

7. The method of claim 6, where providing the request for the particular network management information (NMI) comprises at least one of:

providing, via the request, a name associated with the consumer device;

providing, via the request, the address associated with the consumer device;

providing, via the request, information associated with the particular network management information (NMI); or providing, via the request, information associated with a segment of the particular network management information (NMI).

8. The method of claim 6, wherein the one or more addresses associated with the one or more producer devices comprises a plurality of different addresses associated with a respective plurality of different producer devices, wherein each of the different producer devices includes a duplicate of the particular network management information (NMI) that corresponds to the same NMI identifier, and wherein combining the one or more portions of the particular network management information (NMI) comprises:
combining different portions of the duplicates of the particular network management information (NMI) that correspond to the same NMI identifier and to the same hash code information from respective ones of the plurality of different producer devices.

9. A registrar host associated with a network, the registrar host comprising:
processing logic; and
registry memory coupled to the processing logic;
wherein the processing logic is configured,
to receive a query for particular network management information (NMI) from a consumer device,
to determine if first metadata associated with the particular network management information (NMI) is included in a first registry record of the registry memory,
when included in the registry memory, to provide the first metadata associated with the particular network management information (NMI) and including a particular NMI identifier for the particular network management information (NMI) and an address associated with a producer device to the consumer device, wherein the first metadata identifies the producer device as a source of the particular network management information (NMI) that is identified by the NMI identifier,
to receive second metadata associated with the particular network management information (NMI) from the consumer device wherein the second metadata includes the particular NMI identifier for the particular network management information (NMI) and an address associated with the consumer device, wherein the second metadata identifies the consumer device as a source that duplicates the particular network management information (NMI) that is identified by the NMI identifier, and
to store the second metadata associated with the particular network management information (NMI) and including the particular NMI identifier for the particular network management information (NMI) and the address associated with the consumer device in a second registry record in the registry memory,
wherein after storing the second metadata, the registry memory includes the first and second registry records, wherein the first registry record includes the particular NMI identifier for the particular network management information (NMI) and the address associated with the producer device, and wherein the second registry record includes the particular NMI identifier for the particular network management information (NMI) and the address associates with the consumer device, so that the first and second registry records in the registry memory at the registry host identify the producer device and the consumer device as different sources duplicating the same particular network management information identified by the NMI identifier.

10. The registrar host of claim 9, where the particular network management information (NMI) comprises at least one of:
information associated with operation of the network,
information associated with administration of the network,
information associated with maintenance of the network, or
information associated with provisioning of the network.

11. The registrar host of claim 9, where the processing logic is further configured,
to receive the first metadata associated with particular network management information (NMI) from the producer device before receiving the query, wherein the first metadata received from the producer device includes the particular NMI indicator for the particular network management information (NMI) and the address associated with the producer device, and
to store the first metadata associated with the particular network management information (NMI) including the particular NMI identifier for the particular network management information (NMI) and the address associated with the first producer device in the first registry record in the registry memory.

12. The registrar host of claim 11, where the first metadata associated with the particular network management information (NMI) comprises at least one of:
a name associated with the producer device,
scope and filter information associated with the network management information (NMI),
type information associated with the network management information (NMI),
validity information associated with the network management information (NMI), or
a hash code associated with the network management information (NMI).

13. The registrar host of claim 9, where the query comprises at least one of:
scope and filter information associated with the particular network management information (NMI),
type information associated with the particular network management information (NMI), or
a list of information associated with the particular network management information (NMI).

14. The registrar host of claim 9, wherein the first metadata and the second metadata each comprise respective copies of a same hash code associated with the particular network management information (NMI).

15. A consumer device associated with a network, the consumer device comprising:
processing logic; and
memory coupled to the processing logic;
wherein the processing logic is configured,
to provide a query for particular network management information (NMI) to a registrar host,
to receive, based on the query, first metadata associated with the particular network management information (NMI) wherein the first metadata includes a particular NMI identifier for the particular network management information and one or more addresses associated with one or more respective producer devices, wherein each of the one or more producer devices is a source of the particular network management information (NMI) that is identified by the NMI identifier
to provide one or more requests for the particular network management information (NMI) to the one or more respective producer devices identified from the one or more addresses included in the first metadata associated with the particular network management information (NMI) wherein the one or more requests includes the particular NMI identifier received in the first metadata,
to receive one or more portions of the particular network management information (NMI) from each of the one or more producer devices identified from the one or more addresses included in the first metadata, duplicate the particular network management information (NMI) using the one or more portions of the particular network management information (NMI) received from the one or more producer devices, so that the consumer device and each of the one or more producer devices duplicate the same particular network management information; and to provide second metadata associated with the particular network management information (NMI) from the consumer device to the registry host, wherein the second metadata includes the particular NMI identifier for the particular network management information (NMI) and an address associated with the consumer device, so that the first and second metadata identify the consumer device and each of the one or more producer devices as different sources duplicating the same particular network management information identified by the NMI identifier.

16. The consumer device of claim 15, where the particular network management information (NMI) comprises at least one of:
   information associated with operation of the network,
   information associated with administration of the network,
   information associated with maintenance of the network, or
   information associated with provisioning of the network.

17. The consumer device of claim 15, wherein the first metadata and the second metadata each comprise respective copies of a same hash code associated with the particular network management information (NMI).

18. The consumer device of claim 15, where the second metadata associated with the particular network management information (NMI) comprises at least one of:
   a name associated with the device, an address associated with the device,
   a copy of scope and filter information associated with the particular network management information (NMI),
   a copy of type information associated with the particular network management information (NMI),
   a copy of validity information associated with the particular network management information (NMI), or
   a copy of a hash code associated with the particular network management information (NMI).

19. The consumer device of claim 15, where the request comprises at least one of:
   a name associated with the consumer device,
   an address associated with the consumer device,
   information associated with the particular network management information (NMI), or
   information associated with a segment of the particular network management information (NMI).

20. The consumer device of claim 15, where the processing logic further:
   combines one or more portions of the particular network management information (NMI) that include substantially similar identifier and hash code information.

21. The method of claim 6 wherein the first metadata and the second metadata each comprise respective copies of a same hash code associated with the particular network management information (NMI).

* * * * *

UNITED STATES PATENT AND TRADEMARK OFFICE
CERTIFICATE OF CORRECTION

PATENT NO. : 8,078,576 B2  
APPLICATION NO. : 12/098621  
DATED : December 13, 2011  
INVENTOR(S) : Power et al.

Page 1 of 1

It is certified that error appears in the above-identified patent and that said Letters Patent is hereby corrected as shown below:

On the Cover Page, item (73), under "Assignee", in Column 1, Line 2, delete "(publ)" and insert -- (publ), Stockholm --, therefor.

On the Cover Page, item (56), under "OTHER PUBLICATIONS", in Column 1, Lines 1-2, delete ""Montoring" and insert -- "Monitoring --, therefor.

On the Cover Page, item (56), under "OTHER PUBLICATIONS", in Column 1, Line 3, delete "Laborator." and insert -- Laboratory. --, therefor.

In Column 21, Line 22, in Claim 16, delete "of;" and insert -- of: --, therefor.

Signed and Sealed this  
Twenty-first Day of August, 2012

David J. Kappos  
*Director of the United States Patent and Trademark Office*